W. HARRISON.
SYSTEM FOR SIGNALING THROUGH SPACE.
APPLICATION FILED JULY 20, 1905. RENEWED JULY 20, 1914.
1,120,054.
Patented Dec. 8, 1914.
2 SHEETS—SHEET 1.
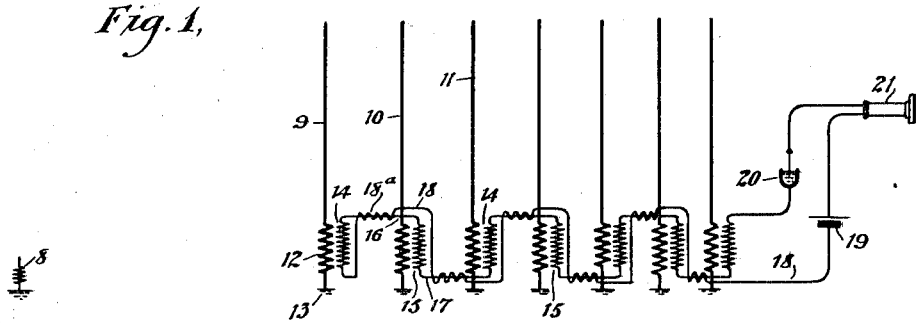
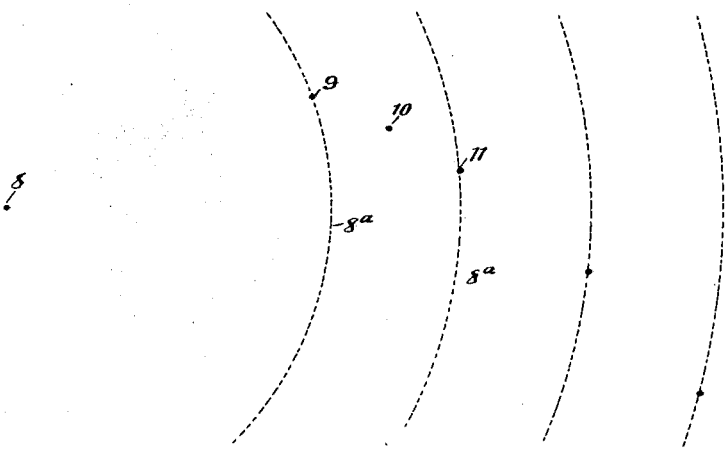
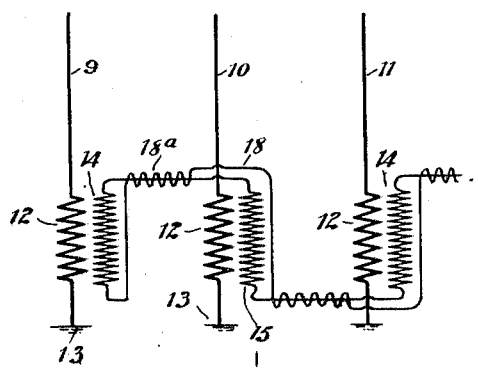
Witnesses
M. C. Abbott
E. W. Logan
Inventor
Walton Harrison

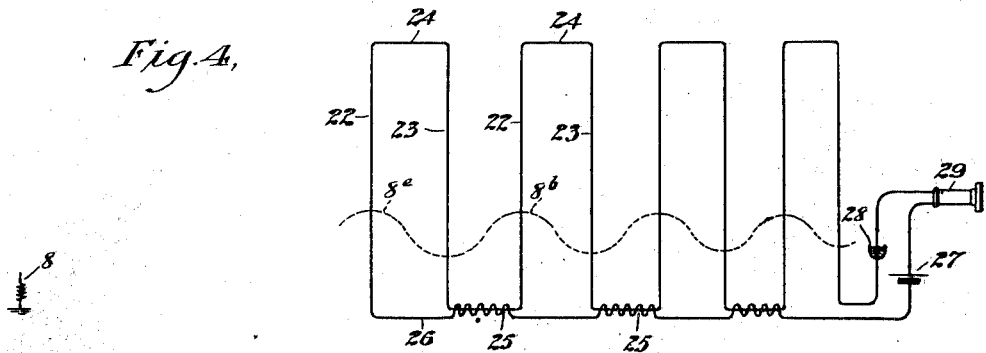
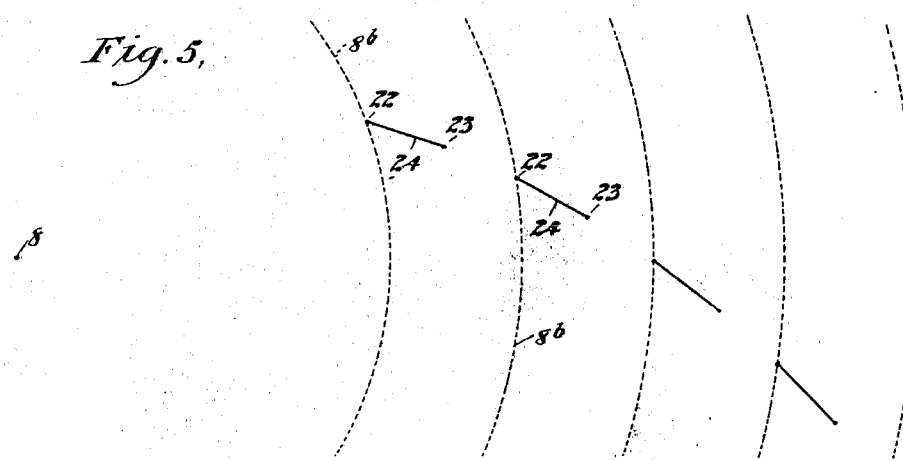
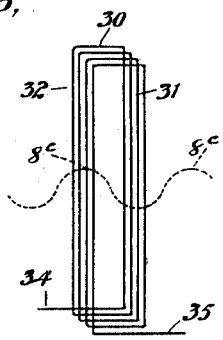
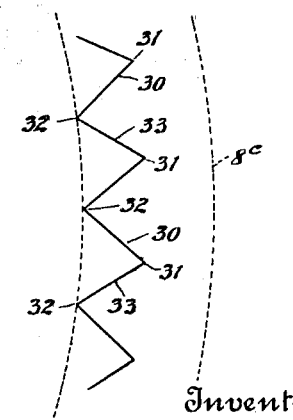

UNITED STATES PATENT OFFICE.

WALTON HARRISON, OF NEW YORK, N. Y.

SYSTEM FOR SIGNALING THROUGH SPACE.

1,120,054. Specification of Letters Patent. Patented Dec. 8, 1914.

Application filed July 20, 1905, Serial No. 270,545. Renewed July 20, 1914. Serial No. 852,316.

*To all whom it may concern:*

Be it known that I, WALTON HARRISON, a citizen of the United States, and a resident of the city of New York, borough of Brooklyn, in the county of Kings and State of New York, have invented a new and Improved System for Signaling Through Space, of which the following is a full, clear, and exact description.

My invention relates to signaling through space without wires, and more particularly to a system in which I seek to attain a number of beneficial objects, among which are the following:—1. Cumulation of wave energy. 2. Selectively in direction of propagation. 3. Connection of a comparatively large number of aerials in series with each other. 4. Shortening the length of the horizontal connecting wires, as compared with the height of the aerials. 5. Neutralization of certain wasteful effects tending to develop in consequence of running the connecting wires parallel with the earth. 6. Aggroupment of aerials within a minimum compass without material injury to the efficiency of the aerials. 7. Provision for maintaining a predetermined phase relation between separated aerials having great height as compared with the wave length.

While not all of the objects mentioned are new, I accomplish them all by means of new arrangements of the wiring.

Reference is made to the accompanying drawings forming a part of this specification, and in which like letters indicate like parts.

Figure 1 is a diagrammatic side elevation of one form of my system, showing the aerials tall as compared with the wave length, some of the aerials being in opposite phase to others, the connections being inductive, and the horizontal connecting wires being comparatively short and twisted together. Fig. 2 is a diagrammatic plan, otherwise similar to Fig. 1, and showing the distribution of the several aerials relatively to the path of propagation of the waves, and the spatial positions of the aerials as defined by the wave length. Fig. 3 is a detail, representing an enlargement of the middle portion of Fig. 1, the upper end of the aerials being broken away; Fig. 4 is a diagrammatic side elevation of another form of my system, in which a comparatively large number of aerials are connected directly together so as to form a single sinuous wire of great length, the horizontal portions of the wire being short as compared with the wave length and the aerials or vertical portions having a definite spatial relation to the wave length and being disposed in a row crossing the path of propagation obliquely. Fig. 5 is a plan, otherwise similar to Fig. 4; Fig. 6 is a diagrammatic perspective view of another form of my system, in which the aerials are arranged in two rows parallel with each other and crossing the path of wave propagation at a right angle to the general direction of said path, the two rows being a half wave length apart; Fig. 7 is a diagrammatic plan, otherwise similar to Fig. 6.

The oscillator is shown at 8, and is adapted to throw off comparatively short waves. For this purpose the oscillator may be of the usual construction.

In the form shown in Figs. 1, 2 and 3 the aerials are shown at 9, 10, 11 and are disposed in a row obliquely crossing the general path of propagation of the waves. These aerials are grounded separately, and so spaced that beginning with the one nearest the oscillator, each successive aerial is exactly half a wave length farther from the oscillator than the previous one. The aerials are thus, by actual measurement, something more than a half wave length apart, the actual distance between successive aerials depending upon the general obliquity of the row, and that is somewhat arbitrary. By this arrangement no aerial is within the electrical shadow of another. Each aerial at the receiving station is high as compared with the wave length, and its constants are so apportioned that its natural period is an integral multiple of the period of the oscillator at the transmitting station. In Fig. 1 I show the aerials at the receiving station as eight times the height of the oscillator. For the sake of simplicity, we may regard all of the aerials as consisting practically of straight wires, the lengths of which have the relative proportions stated.

Each aerial 9, 10, 11 is provided with a primary winding 12, and a ground connection 13, the several primary windings being arranged to act inductively upon secondary windings 14, 15. The lay of the wire in windings 14 is opposite to that in windings 15, and the windings 14 alternate in relative position with the windings 15, being connected thereto by means of comparatively short horizontal portions 16, 17 of a connecting wire 18. This connecting wire is continued so as to form a metallic return, and is twisted upon itself at 18$^a$. By this means the oscillations set up in the secondary windings 14, 15 act inductively upon the metallic return. The transposition of the horizontal portions is thus rendered perfect, so that the tendency of one portion to induce wasteful currents in the earth is counteracted by the opposing tendency of another portion.

A battery is shown at 19, and an electrolytic coherer at 20. Instead of the latter there may be used an ordinary coherer or "anti-coherer", either self-restoring or not or a barretter, or a magnetic detector, or any equivalent of these instruments. The telephonic receiver 21 constitutes the indicating mechanism. The waves are indicated by dotted lines at 8$^a$.

The operation of the system shown in Figs. 1 to 3 is as follows: The comparatively short waves 8$^a$ thrown off by the oscillator, strike all of the aerials and set up oscillations therein. At any particular instant when the first, third, fifth and seventh aerials are in a certain phase, the intermediate aerials are in opposite phase thereto, and vice versa; and when the phase is reversed in one aerial, it is reversed in all the others, so that the predetermined phase relation is constant. The aerials being in series with each other with respect to the oscillator detector 20, the latter is subjected to a cumulation of wave energy representing the added wave energy received by all of the aerials. This wave energy manifests itself in the shape of increased potential of the oscillations playing upon the wave detector, the effect being analogous to that of a single aerial having a height equal to the combined height of the many aerials.

It will be noted there is only one direction of propagation from which waves of a given length can affect the system to a maximum degree, so that where large numbers of receiving aerials are employed a comparatively slight variation in the wave length is sufficient to produce discord as between the receiving aerials. These facts render the system selective in direction. It will also be noted that little or no wave energy is wasted by the horizontal connections, because the length of the same is reduced to a minimum as compared with the height of the aerials, and further because the wasteful tendency is turned against itself and used to advantage.

In Figs. 4 and 5 the oscillator is shown at 8, the waves at 8$^b$. The several aerials 22 are connected to the several aerials 23 by horizontal portions 24, 25, and with a metallic return 26, the latter and the portions 25 being twisted together. The battery is shown at 27, the oscillator detector at 28, and the telephonic receiver or other indicating mechanism at 29.

The aerials being disposed in a row crossing the path of propagation, as indicated in Fig. 5, the aerials are energized by the waves 8$^b$, 8$^e$. The spatial relations being the same as above described, it follows that the aerials act both cumulatively and selectively. Here, again, the horizontal connections are comparatively short, and wasteful tendencies due to parallelism with the ground are neutralized and turned to advantage.

In Figs. 6 and 7 the horizontal connections are shown at 30, 33, the aerials at 31, 32, and the wire terminals at 34, 35. In this arrangement the aerials are formed into two parallel rows, both crossing the path of propagation. The aerials 31 are always in like phase with each other, the aerials 32 are always in like phase with each other, but the aerials 31 are always in opposite phase to the aerials 32.

Having thus described my invention, I claim as new and desire to secure by Letters Patent:—

1. In a system for signaling through space without wires, the combination of a plurality of aerials, and a local circuit energized by said aerials, said local circuit including a conductor transposed relatively to itself in order to neutralize the inductive effects of currents in said conductor in relation to neighboring conductors, such as the earth.

2. In a system for signaling through space without wires, the combination of a plurality of receiving aerials, more than two in number, spaced at unequal distances from the source of wave propagation and grounded separately and also spaced apart in a direction crossing the path of wave propagation, and a local circuit common to all of said aerials and connected inductively therewith so as to be energized by a cumulation of energy from all of said aerials.

3. In a system for signaling through space without wires, the combination of a source of electro-magnetic wave energy, a plurality of receiving aerials, more than two in number, spaced apart in a direction crossing the path of wave propagation; said aerials having equal periods and being grounded at unequal distances from said source, and a local circuit connected inductively with all of said aerials and energized by a cumulation of energy therefrom.

4. The combination of a plurality of aerials having equal oscillation periods and spaced apart in a direction crossing the path of propagation of the waves and grounded separately, a plurality of transformers each provided with a primary winding and a secondary winding, the several primary windings being connected directly with the several aerials, an oscillation detector and connections from the latter to all of said secondary windings.

5. In a wireless signaling system, the combination of a plurality of transformers, more than two in number, each transformer being provided with a primary winding and a secondary winding, a number of aerials equal to the number of transformers, each aerial being connected with a primary winding and also being grounded, and means for adding the separate energies of the secondary windings.

6. In a wireless signaling system, the combination of a plurality of transformers, more than two in number, each provided with a primary winding and a secondary winding, a separate aerial connected with each primary winding for energizing the latter, each aerial and the primary winding associated with it being provided with an individual ground wire, and means for adding the separate energies received inductively by the several secondary windings.

7. In a wireless signaling system, the combination of a plurality of antennæ, more than two in number, an equal number of transformers each provided with a winding and grounded separately, and means for inductively associating all of said windings in order to add the energies received.

8. In a wireless signaling system, the combination of a plurality of transformers, more than two in number, a number of aerials equal to the number of transformers, each transformer being connected to a separate aerial and grounded separately from the other transformers, and means for adding the separate energies of all of said transformers.

9. In a wireless receiving system, the combination of a plurality of transformers, more than two in number, spaced apart at intervals related to the wave length, a plurality of separate aerials equal to the number of transformers and likewise spaced apart by intervals related to the wave length, each aerial being connected to its individual transformer, and means for adding the several energies of the respective transformers.

10. In a wireless signaling system, the combination of a plurality of separate aerials, a plurality of separate transformers connected with said antennæ and grounded, and means connected with all of said transformers for adding the effects thereof.

11. In a wireless signaling system, the combination of a plurality of separate aerials, a transformer connected with each aerial, each aerial and its transformer having a natural time period equal to that of any other aerial and its transformer, and means for adding the effects of the separate energies of the several transformers.

In testimony whereof I have signed my name to this specification in the presence of two subscribing witnesses.

WALTON HARRISON.

Witnesses:
W. M. AVERY,
HENRY E. MEAD.